United States Patent [19]
Mead

[11] 3,758,130
[45] Sept. 11, 1973

[54] RIDING MOWER
[75] Inventor: Robert B. Mead, Wilmington, Ohio
[73] Assignee: Boise Cascade, Boise, Idaho
[22] Filed: July 19, 1971
[21] Appl. No.: 163,881

[52] U.S. Cl............... 280/96, 280/111, 56/DIG. 22
[51] Int. Cl............................................. B62d 7/10
[58] Field of Search................... 280/96, 95 R, 111, 280/87; 56/DIG. 22, 17.1, 17.2

[56] References Cited
UNITED STATES PATENTS

| | | | |
|---|---|---|---|
| 2,989,134 | 6/1961 | Kamlukin...................... 280/95 R X |
| 3,266,590 | 8/1966 | Hungerford....................... 280/96 X |
| 3,466,855 | 9/1969 | Hanson et al................. 56/DIG. 22 |
| 3,014,734 | 12/1961 | Swenson......................... 280/111 X |
| 1,851,866 | 3/1932 | Quinan........................... 280/111 X |
| 3,269,100 | 8/1966 | Smith................................... 56/17.2 |
| 3,063,226 | 11/1962 | Pfauser......................... 56/DIG. 22 |

Primary Examiner—Kenneth H. Betts
Attorney—Jerome P. Bloom

[57] ABSTRACT

A front end suspension and steering system for a ground traversing vehicle providing a deck elevated relatively to ground level. A beam-like wheel support member in an underlying relation to the deck is capable of relative rocking motion in a transverse plane and carries spaced apart wheel axles. A steering mechanism accessible from above the deck connects to the wheel axles for rotary adjustment thereof. The steering mechanism incorporates universal means enabling rocking movement of the support member responsive to changes in terrain in any position of angular adjustment of the wheel axles.

11 Claims, 7 Drawing Figures

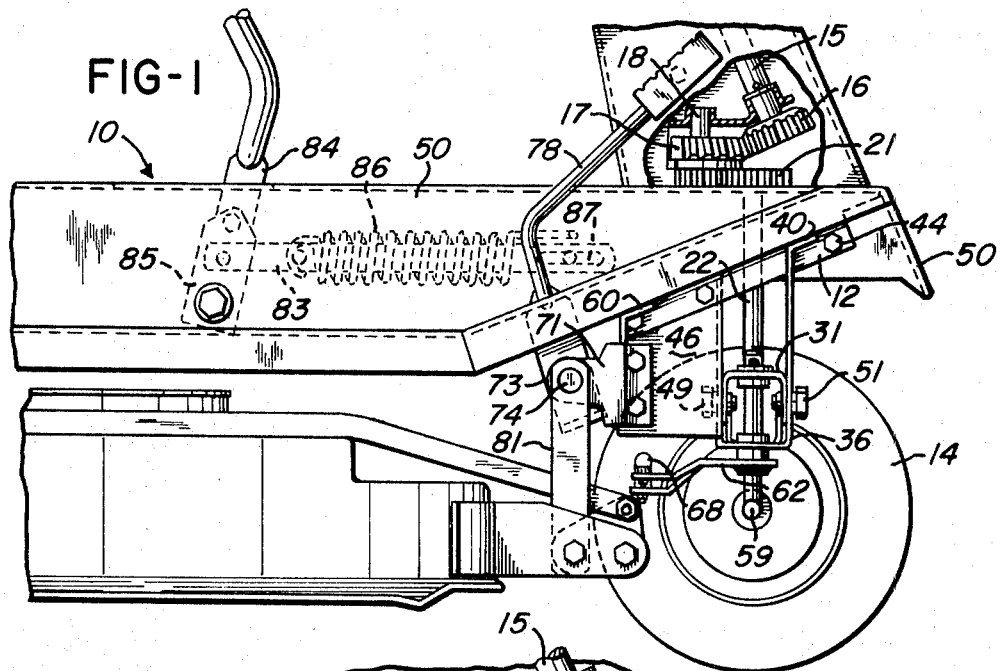
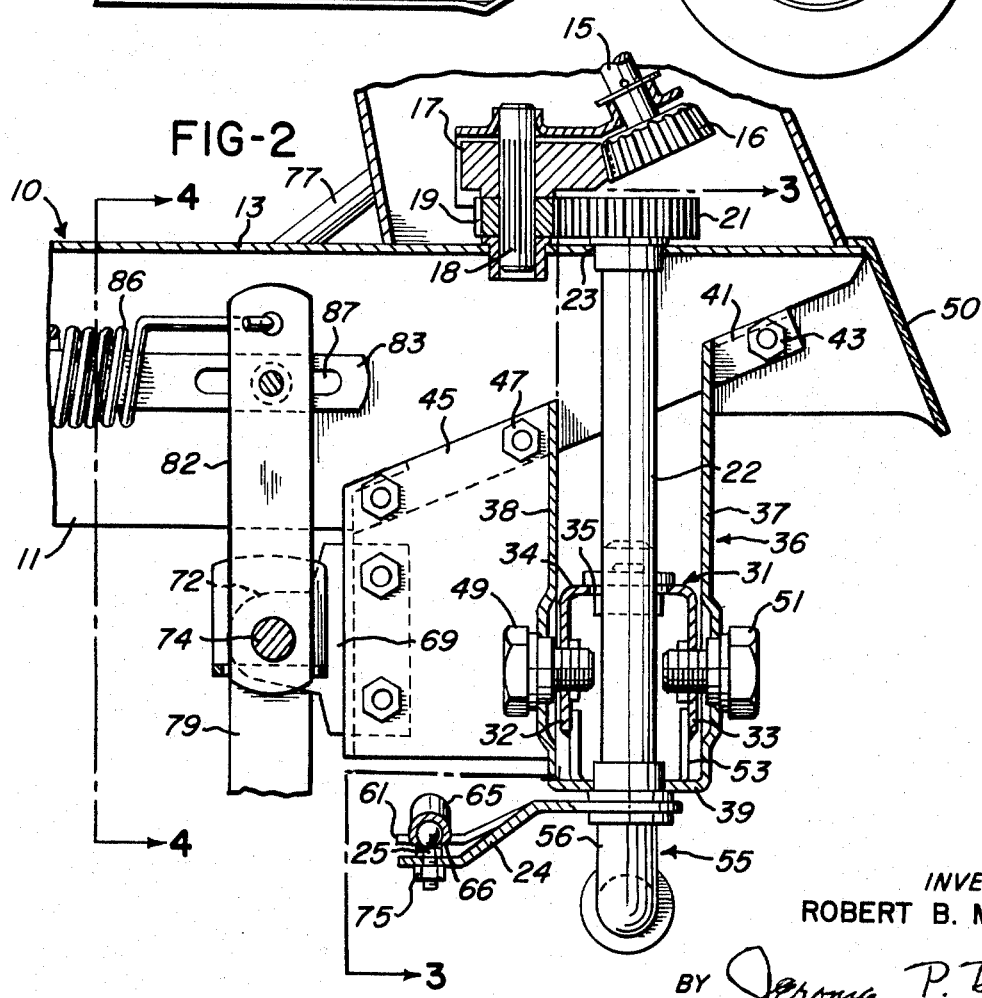

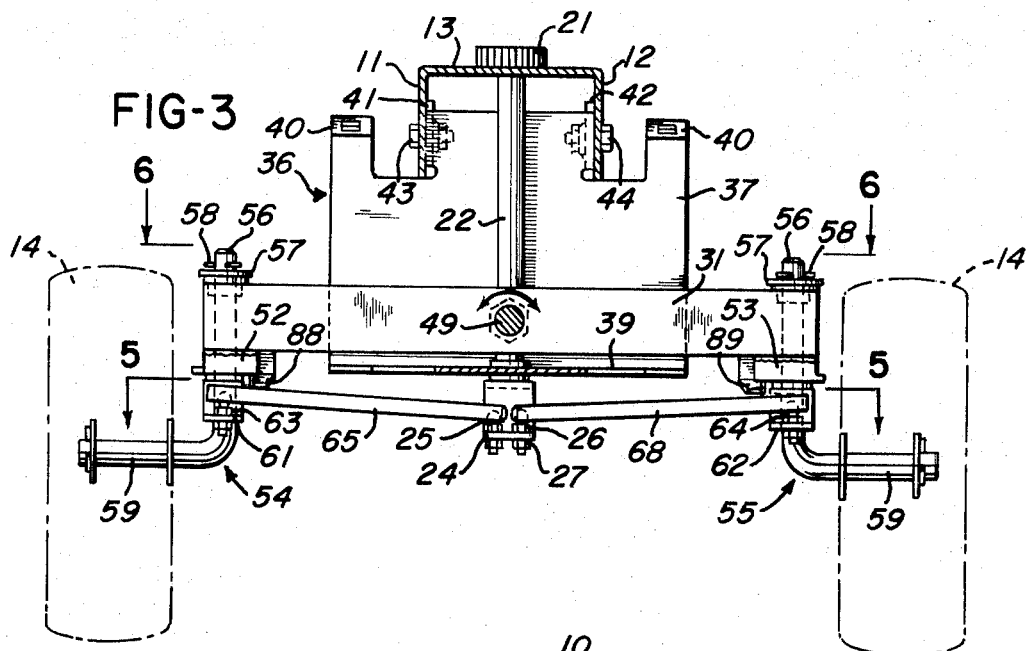
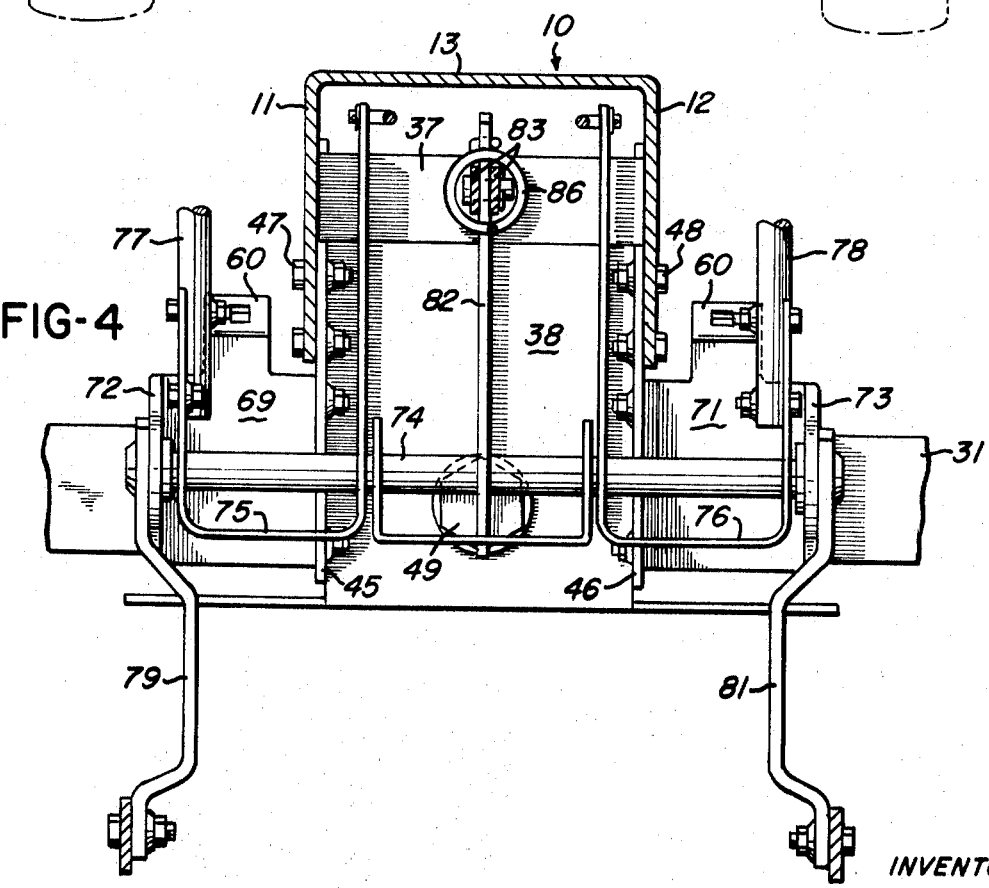

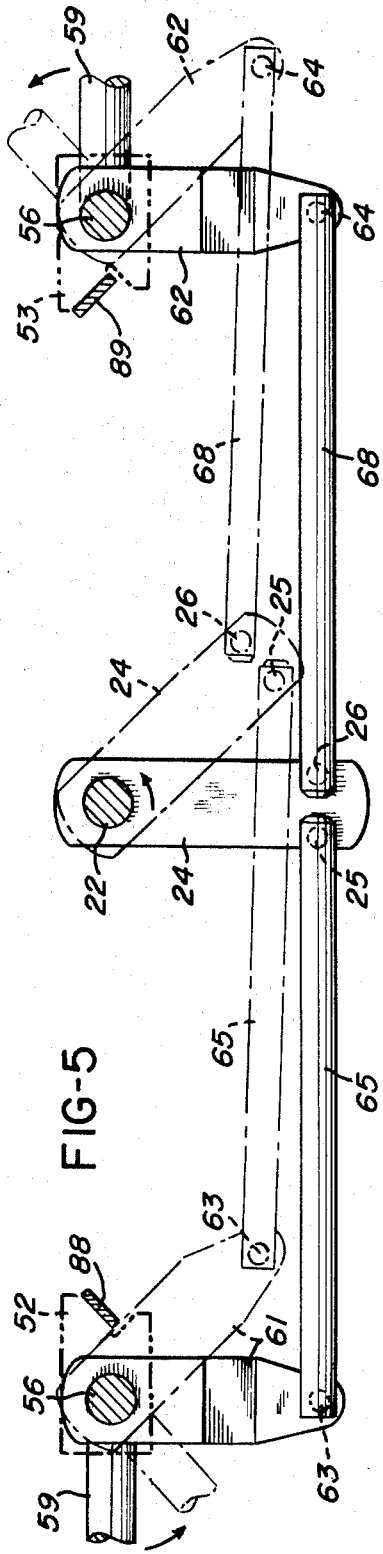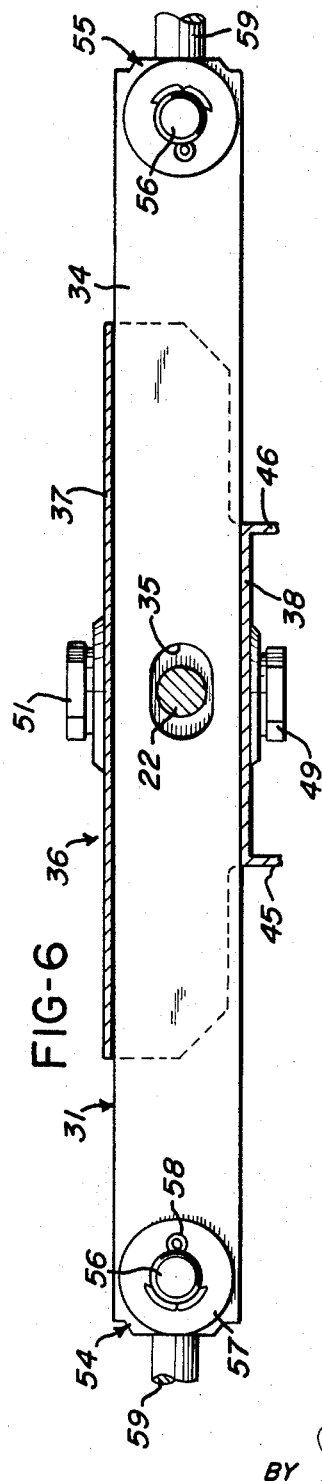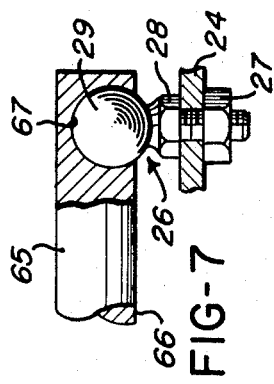

RIDING MOWER

BACKGROUND OF THE INVENTION

This invention relates to front end suspension and steering systems of ground traversing vehicles, having particular though not limited reference to riding mowers. In the prior art, suspension and steering systems have been located remotely of the steering column. The steering connection is indirect in nature and there is an absence of the kind of integrated suspension and steering mechanism desirable to give the mower greater compactness and ease of operation. A large number of parts, associated in considerable complexity, has in the past been used in an effort to allow steering while the mower travels over uneven terrain. Prior art devices accordingly have achieved the end results required of a riding mower or the like in a relatively inefficient manner. They are not especially characterized by simplicity, reliability and lower manufacturing costs, all of which have become increasingly important as the popularity of riding mowers has increased.

SUMMARY OF THE INVENTION

The instant invention is directed to the realizing of concepts of simplicity, reliability and lower manufacturing cost. It locates the steering column in directly superposed relation to the front wheel suspension system. A pivotal beam acts as a wheel support member. All prior complexities in the connection from the steering column to the wheels are avoided. A simple universal means in the connection from the steering column to the wheel axles readily permits rocking movement of the wheel support member in any angular position of adjustment of the wheels. A suspension and steering mechanism in accordance with the instant invention is thus a compact easy to operate device, offering substantial advantages of simplicity and reliability as compared to devices of the prior art. According to a further feature of the invention the use of and mounting of the pivotal support member is such as to enable advantageous positioning of other mower components including retractable means suspending a mower housing.

An object of the invention is to provide a generally new front end steering and suspension system for a ground traversing vehicle.

Another object of the invention is to achieve by a reorganization of mower components and the substitution of direct for indirect operating controls, a substantially more compact, easier operating device than known heretofore.

A further object of the invention is to introduce a new form of steering connection between a steering post and wheel axles providing for easier, more effective steering of the vehicle over uneven terrain.

BRIEF DESCRIPTION OF THE DRAWINGS

FIG. 1 is a fragmentary view in side elevation of a riding mower incorporating front end suspension and steering mechanism in accordance with the present invention, a front wheel being removed;

FIG. 2 is a view in longitudinal section, taken through the mower mechanism of FIG. 1;

FIG. 3 is a view in cross section, taken substantially along the line 3—3 of FIG. 2;

FIG. 4 is a view in cross section, taken substantially along the line 4—4 of FIG. 2;

FIG. 5 is a detail plan view showing the manner of operating steering rods from a steering post, an operating position being shown in broken lines;

FIG. 6 is a detail plan view of a wheel support member and associated parts, being taken substantially along the line 6—6 of FIG. 3 and FIG. 7 is a detail fragmentary view of a steering rod, showing a recess means therein.

DESCRIPTION OF A PREFERRED EMBODIMENT

The invention is, for illustrative purposes, disclosed as embodied in a riding mower. In the illustrated embodiment, many of the mower components have been omitted as being unnecessary to an understanding of the invention. A frame member 10 is the principal support of all mower components. It is constructed to have the configuration of an inverted U. Side walls 11 and 12 are joined at their upper edges by a horizontal wall 13 forming an upper platform or deck. Various engine mounting, foot rest and like panels (not shown) are mounted on the deck 13. The frame 10 is held in a relatively elevated relation to ground surface by rear wheels (not shown) and by front wheels 14. Power to drive the mower is applied to the rear wheels while the front wheels 14 are used for steering. At the front end of the frame 10, adjacent the wheels 14, frame side walls 11 and 12 are cut away to have the truncated configuration shown in FIGS. 1 and 2.

Suitably supported above the deck 13 of the frame 10, and in generally overlying relation to the wheels 14, is a steering column 15. At its lower end, the column 15 terminates slightly above deck 13 and has secured thereto a bevel gear 16. The latter meshes with a like but segmental gear 17 made fast to a stub shaft 18 upstanding in and relatively rotatably mounted in the deck 13. A pinion 19 on the stub shaft 18 meshes with a gear 21 occupying a position of substantial rest upon the upper surface of deck 13. A steering post 22 disposes substantially perpendicularly of deck 13 and is located between frame side walls 11 and 12 approximately centrally thereof. At its upper end, the post 22 extends through an opening 23 in the deck 13 and is secured to gear 21. The post extends downwardly between and below side walls 11 and 12 and has secured to its lower end, as by welding, one end of a lever arm 24. The arm 24 projects in a general longitudinal sense relatively to the frame 10 and toward the rear thereof. Intermediate its ends it is deflected below the end of post 22 and at its outer extremity is reversely bent to provide a mounting for a laterally spaced apart pair of studs 25 and 26. The studs 25 and 26, and the means to secure their mounting in arm 24, are identical so that a description of one will suffice for both. Thus, each stud disposes perpendicularly in the outer end of the arm 24, with a lower end projecting below the arm and being threaded to receive a nut 27. A nut 28 is formed integrally of the stud above the arm. A portion of the upper projecting end of the stud has a ball formation 29. The studs 25 and 26 occupy parallel positions in the arm 24 and are adjusted to project substantially equal distances above the arm, with the studs being locked in an adjusted position by the nuts 27 and 28.

The steering post 22 accepts rotary control movements of the steering column 15 and moves in corresponding increments about its own longitudinal axis to effect oscillatory adjustment of the arm 24. In a manner to be seen, this rotary turning movement of the post 22 and arm 24 effects angular adjustment of the front wheels 14.

In substantially the same plane transversely of the frame 10 occupied by the post 22 is a beam 31 acting as a wheel support member. The member 31 is channel-like in configuration, having side walls 32 and 33 and an interconnecting upper plate portion 34. In the latter is a laterally elongated opening 35 through which the post 22 passes, the arrangement being one to allow a substantial freedom of rocking or tilting motion of the support member relatively to the steering post. The support member 31 is mounted to and contained by a subframe unit 36. This is a part of irregular configuration which includes upstanding transverse walls 37 and 38 interconnected at their lower edges by an integral web 39. A pair of upstanding tabs 41 and 42 on the wall 37 are received within the truncated portion of frame 10 in immediately adjacent relation to respective side walls 11 and 12. Fasteners 43 and 44 attach the tabs 41 and 42 to the frame walls. The wall 38 is similarly received between the frame side walls 11 and 12. In this instance, however, opposite side edges of wall 38 are bent to project rearwardly as wall extensions 45 and 46. These secure to frame side walls 11 and 12 by respective sets of fasteners 47 and 48. On side extremities of the wall 37, outside frame member 10, are turned over tabs 40, providing a part of the support for a cover 50 superimposing over frame member 10.

The beam or wheel support member 31 disposes between the walls 37 and 38 of the sub-frame unit, side portions 32 and 33 of the wheel support member having a substantially flush contact with respective opposing surfaces of walls 37 and 38. Bolt means 49 interconnects sub-frame wall 38 and beam wall portion 32. Like bolt means 51 interconnects sub-frame wall 37 and beam wall portion 33. The bolt means are in a common plane perpendicular to the plane occupied by support member 31, the perpendicular plane being common also to post 22. Further, the described perpendicular plane passes through the mid portion of support member 31 and it will be understood that bolt means 49 and 51 provide pivotal connections whereby member 31 is mounted for rocking motion relatively to the subframe 36 within the transverse plane it occupies. The support member is positioned in a relatively elevated relation to the bottom web portion 39 which acts as a stop member, limiting or defining the extremes of oscillatory movement of the member 31.

At opposite ends of the support member 31, U-shaped inserts 52 and 53 are inserted in the open lower side of the support member and welded or otherwise secured thereto to be a part of the support member. The closed bottom portions of the inserts 52 and 53 provide walls in spaced parallel relation to the support member wall 34. The opposing wall sections act as bearings for wheel axles 54 and 55. The wheel axles are L-shaped members and are identically constructed. Thus, each has a vertical portion 56 having a rotary bearing in vertically spaced walls of the support member and held therein by means including a washer 57 and a cotter pin 58. A horizontal portion 59 of each wheel axle disposes below the support member 31 and is in relatively projecting relation thereto in a longitudinal sense. The horizontal portions of the wheel axles suitably mount the front wheels 14.

Substantially at the juncture of the vertical portion 56 of wheel axle 54 and of horizontal portion 59 thereof, a lever arm 61 is secured in a manner to project rearwardly of the frame in a generally parallel relation to the lever arm 24 projecting from the steering post 22. A like arm 62 is secured to wheel axle 55 and projects similarly therefrom. On the arm 61 is an upwardly projecting stud 63 constructed like the previously considered studs 25 and 26 and adjustably installed in a similar manner. A corresponding stud 64 is mounted in to project upwardly of the lever arm 62. The stud 63 in arm 61 and the stud 25 in lever arm 24 are interconnected by a relatively inflexible rod 65. The rod 65 has a longitudinal flat 66 formed thereon. Near opposite ends of the rod, opening through the flat 66 are substantially hemispherical recesses 67. These are adapted to interfit with the ball formation on the upstanding end of stud 25 and with the corresponding ball formation on the upstanding end of stud 63. With the parts so connected, it will be seen that the lever arms 24 and 61 are connected for substantially unison motion. Further, the rod connects to respective lever arms with freedom of relative motion in plural senses in that the studs 25 and 63 are capable of rotary movement in the hemispherical recesses 67 while at the same time the rod 65 is capable of a bodily rocking motion upon the ball formations at the upper ends of the studs 25 and 63. A rod 68 is constructed like the rod 65 and interconnects stud 26 on lever arm 24 and stud 64 on arm 62.

The sub-frame 36 serves a useful purpose in a compact locating of front end suspension and steering mechanism. It has a further utility in supporting and mounting other mower components in a suspended relation to the frame 10. In this connection brackets 69 and 71 are mounted to respective wall extensions 45 and 46 of the sub-frame unit. The bracket 69 has a turned over ear 72 and the bracket 71 a similar turned over ear 73. A shaft 74 disposes in an underlying transverse relation to the frame 10 and has its opposite ends rotatably mounted in the ears 72 and 73. Shaft 74 is a mounting shaft of general utility. U-shaped members 75 and 76 are rotatably mounted thereon and have integrated operating attachments in the form of respective foot pedals 77 and 78. In a manner which it is unnecessary here to consider, the pedals 77 and 78 are actuated to rock the parts 75 and 76 to initiate clutching, braking or other control operations in the riding mower. In addition, the shaft 74 has welded to its opposite ends downwardly extending arms 79 and 81. These attach, in a suitable manner, to a mower housing, oscillatory adjustment of the shaft 74 being used selectively to raise and lower the mower housing relatively to ground surface. Oscillatory adjustment of the shaft 74 is achieved by a lever 82. Lever 82 terminates at an upper end thereof below deck 13 within the frame 10 where it pivotally attaches to a link 83. The latter interconnects lever 82 and another lever 84, the latter extending upward through the deck 13 to be manually accessible for longitudinal rocking motion. A bracket 85 pivotally mounts the lever 84 between the walls 11 and 12 of the frame. Spring means 86 and a pin in slot connection 87 may be used in the connection between levers 82 and 84 to provide for lost motion in the connection from lever 84 to the mower housing. Upstanding from the brackets 69 and 71 are turned over tabs 60 complementary to the tabs 40 in providing support for the cover 50.

The frame 10 mounts a seat for the rider who steers the vehicle by turning wheels 14, the turning impulses being applied through steering column 15. Rotary motion of column 15 is transmitted through gear means 16, 17, 18, 19 and 21 to the steering post 22 which is turned to and assumes rotary positions of adjustment in correspondence with those assumed by column 15. Turning in unison with the steering post 22 is the lever arm 24 secured to the lower end thereof. The outer free end of the arm 24 accordingly executes arcuate swinging movements laterally shifting the upstanding studs 25 and 26 thereon. By reason of the connections afforded by rods 65 and 68 the swinging movement of lever arm 24 is transmitted to arms 61 and 62 attached to respective wheel axles 54 and 55. Thus, as one rod 65 and 68 pushes its associated arm 61 or 62 the other rod pulls its associated arm with the result that the wheel axles turn in unison with one another and in the same direction to assume a selected angular position of adjustment as dictated by the rotational impulse given steering column 15. With the wheel axles adjusted for straight line movement of the vehicle the respective horizontal axle portions 59 are in line with one another, the arrangement being substantially as shown in FIG. 3. The several lever arms 24, 61 and 62 are in a position of substantially straight line extension toward the rear of the vehicle and rods 65 and 68 are positioned substantially in alignment with respect to one another. In response to rotation of the post 22 a corresponding angular displacement of the lever arm 24 takes place, as from the full line position of FIG. 5 to the broken line position thereof. A pull-push action takes place with respect to the rods 65 and 68 in the process of which the rods are longitudinally offset relatively to one another. A condition of parallelism between the rods is maintained, however, so that the lever arms 61 and 62 attached to the wheel axles are angularly repositioned in synchronism with one another and to the same extent. Steering limits may be defined by any convenient means, as for example by lugs 88 and 89 dependent from the support member 31 at its ends. Respective arms 61 and 62 abut the lugs 88 and 89 at respectively opposite extremes of movement of the steering mechanism.

The assembly comprising wheel support member 31, wheel axles 54 and 55 and wheels 14 is an integrated unit. As such, it gives substantial strength and reliability to the front end of the vehicle. This is not achieved, however, at any sacrifice in riding or steering qualities since the described assembly readily adapts to and conforms to unevenness in the ground being traversed. The pivot means represented by bolts 49 and 51 allows the support member 31 and through it the wheels 14 complete freedom of adjustment in the transverse plane of the support member. Further, rocking motion of the support member and wheel assembly may occur in any angular position of adjustment of the wheels without inhibiting steering ease nor unduly stressing the steering mechanism. The mode of attachment of the rods 65 and 68 to the studs 25 and 26 and to the studs 63 and 64 assures a substantially universal action in which the rods may move in plural senses to accommodate relative rising and lowering movements of opposite ends of the wheel assembly. Thus, a steering impulse in an angular disposition of support member 31 involves a relative swinging movement of the rods 65 and 68 and simultaneously therewith a bodily pivoting action of the rods about the stud means to which they are attached, such motion being readily accommodated by reason of the slip fit nature of the provided connections.

The sub-frame unit 36 positions at the truncated front end of main frame member 10 and mounts elements of the steering and wheel support assembly in a closely coupled underslung relation to the truncated portion of the main frame member. The arrangement makes possible a new concept of compactness in riding mowers as well as providing for direct action steering, using few parts and emphasizing simplicity and reliability of construction. An advantage of improved stabilization also results, productive of easier riding and steering and better balance. In this connection, wheel support member 31 may be broadly considered to have the character of a stabilizer beam, projecting laterally of the frame member in opposite directions and maintaining a balanced relation thereto in any angular position of adjustment of the wheels and in any terrain induced attitude of adjustment it may itself assume.

From the above description it will be apparent that there is thus provided a device of the character described possessing the particular features of advantage before enumerated as desirable, but which obviously is suceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

I claim:

1. A front end steering and suspension system for a riding mower or the like including a frame providing a relatively elevated deck with respect to which mower or other work components may be mounted in a suspended relation, comprising a wheel support means having a laterally elongated opening therein, means suspending said support means beneath said frame in a plane transverse thereto and for rocking motion in said transverse plane, laterally spaced apart wheel axles carried by said support means and rotatable relatively thereto, and steering mechanism for effecting unison rotary movement of said wheel axles to angular positions of adjustment relative to said support means, said steering mechanism comprising a steering post relatively rotatably carried by said frame to extend below said deck, said steering post disposing substantially in the transverse plane occupied by said support means and projecting through said elongated opening therein, said opening accommodating rocking motion of said support means relative to said post, said steering mechanism further including connecting means between said post and said wheel axles utilizing angular rotary motion of said post to effect unison angular adjustment of said wheel axles, said connecting means incorporating a universal means accommodating rocking motion of said wheel support means in any angular position of adjustment of said wheel axles.

2. A front end steering and suspension system for a riding mower or the like, including a frame providing a relatively elevated deck with respect to which mower or other work components may be mounted in a suspended relation, comprising a wheel support means having a laterally elongated opening therein, means suspending said support means beneath said frame in a plane transverse thereto and for rocking motion in said transverse plane, laterally spaced apart wheel axles carried by said support means and rotatable relatively thereto, and steering mechanism for effecting unison rotary movement of said wheel axles to angular positions of adjustment relative to said support means, said steering mechanism comprising a steering post relatively rotatably carried by said frame to extend below said deck, said steering post disposing substantially in the transverse plane occupied by said wheel support means and projecting through said elongated opening therein, said opening accommodating rocking motion of said support means relative to said post, said steering mechanism further including connecting means between said post and said wheel axles utilizing angular rotary motion of said post to effect unison angular adjustment of said wheel axles, said connecting means incorporating a universal means accommodating rocking motion of said wheel support means in any angular position of adjustment of said wheel axles, said support means including a channel shaped member and a subframe in connection with said frame providing mounting means pivotally connecting opposite walls of said channel shaped member to said sub-frame in a common plane perpendicular to the transverse plane occupied by said support means, said steering post passing through said channel shaped member in said common plane.

3. A system according to claim 2, wherein said sub-frame is a substantially U-shaped member and said wheel support means is received between its upstanding leg portions, a bottom portion of said U-shaped member limiting said rocking motion of said wheel support means.

4. A system according to claim 3, said sub-frame providing mounting means accommodating the suspension therefrom of a mower or other operating unit.

5. A system according to claim 4, said sub-frame further providing means for mounting controls for operating components of the vehicle in which it is incorporated.

6. A system according to claim 5, wherein said frame is truncated at the bottom of its forward end and said sub-frame is nested in respect to the offset provided by said truncated forward end.

7. A front end steering and suspension system for a riding mower or the like, including a frame providing a relatively elevated deck with respect to which mower or other work components may be mounted in a suspended relation, a beam element supported beneath said frame in a plane transverse thereto and for rocking motion in said transverse plane, laterally spaced apart wheel axles carried by said beam member and rotatable relatively thereto, a steering post relatively rotatably carried by said frame substantially in said transverse plane and extending downward to and through the location of said beam member, said post and said beam member being relatively configured to provide for an intersecting relation thereof in said transverse plane with said beam member having freedom of rocking motion, and means interconnecting said steering post and said wheel axles effecting movement of said wheel axles in conjunction with and in correspondence with rotational movement of said steering post, said interconnecting means incorporating universal means accommodating rocking motion of said beam member in any angular position of adjustment of said wheel axles.

8. A system according to claim 7, wherein said steering post is mounted to be substantially perpendicular to the deck provided by said frame.

9. A system according to claim 7, wherein said beam member has a laterally elongated opening for passage of said post therethrough, said opening accommodating rocking motion of said beam member relative to said post.

10. A system according to claim 7, wherein said wheel axles have vertical portions rotatably mounted in said beam member on opposite sides of and in a substantially parallel relation to said steering post, said interconnecting means and incorporated universal means including substantially parallel lever arms respectively attached to said steering post and to said wheel axles, rods extending from a lever arm on said post to respective lever arms on said wheel axles, and means attaching said rods to said lever arms affording relative motion of said rods to said lever arms in plural senses.

11. A system according to claim 7, wherein said beam member is a fabricated part presenting front and back walls with said steering post projecting intermediately thereof, and a sub-frame connected with said frame providing spaced leg portions to which the front and back walls of said bearing member are respectively pivotally attached.

* * * * *